Aug. 11, 1925.
D. K. GANNETT ET AL
1,548,878
ELECTRICAL SIGNALING SYSTEM
Filed April 19, 1920
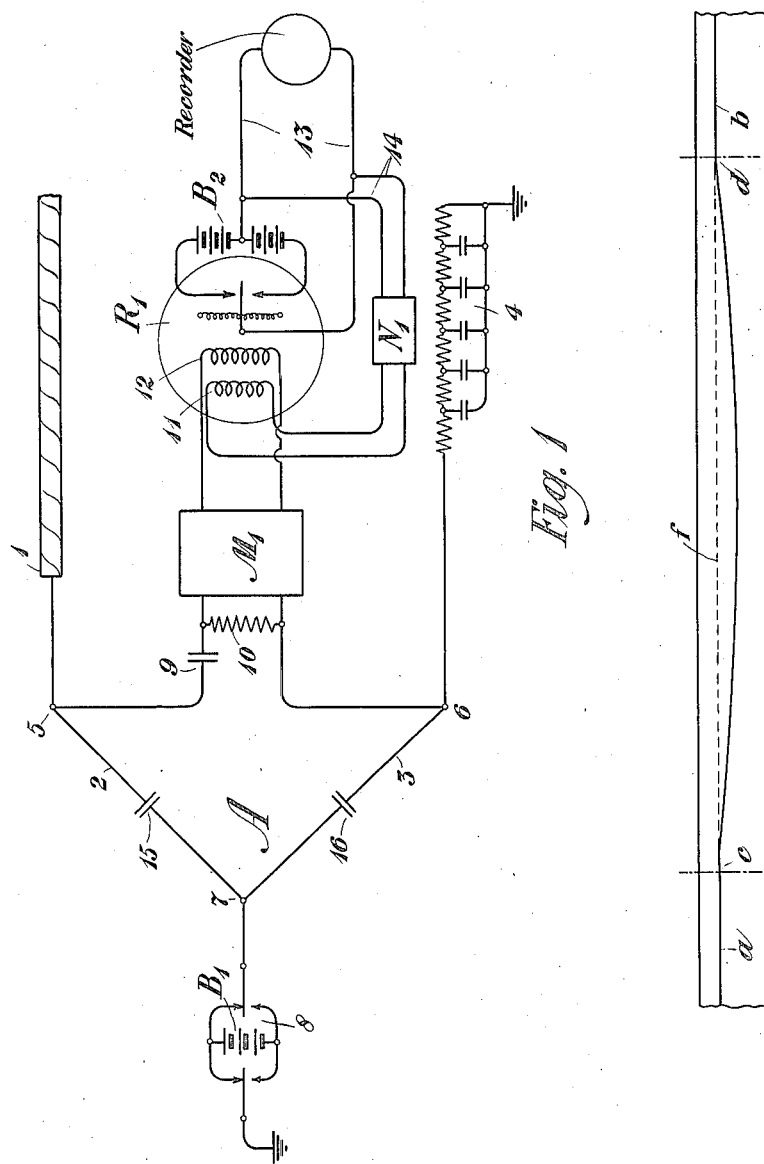
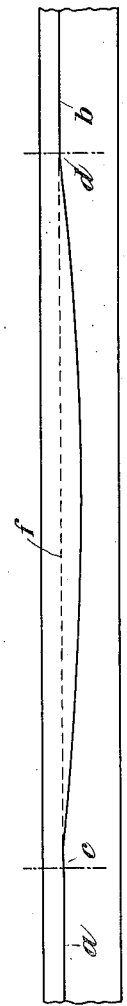
INVENTORS
D.K.Gannett and M.Kirkwood
BY
ATTORNEY Patented Aug. 11, 1925.

1,548,878

UNITED STATES PATENT OFFICE.

DANFORTH K. GANNETT, OF ARVERNE, NEW YORK, AND MACLEAN KIRKWOOD, OF EAST ORANGE, NEW JERSEY, ASSIGNORS TO AMERICAN TELEPHONE AND TELEGRAPH COMPANY, A CORPORATION OF NEW YORK.

ELECTRICAL SIGNALING SYSTEM.

Application filed April 19, 1920. Serial No. 375,078.

*To all whom it may concern:*

Be it known that we, DANFORTH K. GANNETT and MACLEAN KIRKWOOD, residing at Arverne, Far Rockaway, and East Orange, respectively, in the counties of Queens and Essex, respectively, and States of New York and New Jersey, respectively, have invented certain Improvements in Electrical Signaling Systems, of which the following is a specification.

This invention relates to an electrical signaling system and especially to means associated with such system designed to suppress the effect upon the receiving apparatus of very low frequency disturbances that may be set up in such system.

In operating submarine telegraph cables equipped with relays to transmit the signaling impulses from one section of cable to another, or to transmit the said impulses to recording devices, difficulty is frequently experienced in the reception of signals due to the displacement of the normal zero of the armature to one side or the other of the relay. This difficulty may result from the action of earth currents upon the receiving circuit which causes the zero position of the armature of the relay to move to one side or the other, thus interfering with the reception of the signals. This undesired movement of the armature of the relay may also be produced by what is known as a "roll" in the duplex balance which moves the zero line of the incoming signal wave to one side or the other when a plurality of outgoing signals of the same polarity are being transmitted into the cable in rapid succession. This displacement of the zero line arises from a slight unbalance of the network in which the receiving apparatus is located, which permits a transmitted wave of very low frequency to enter the receiving circuit at the same end of the cable from which the transmitted impulses are being sent.

Ordinarily, in a submarine cable adapted for duplex operation, great care must be taken to balance the cable by means of specially designed balancing networks which simulate to a high degree the electrical characteristics of the submarine cable. When this balance is sufficiently good no "roll" results from the transmission of a succession of impulses of the same polarity into the cable. In operation, however, it is usually impracticable to adjust the balancing network with sufficient accuracy to entirely eliminate the difficulty. Furthermore, when amplifiers or magnifiers such as the vacuum tube or the selenium type are used, which are capable of passing either direct current or alternating current of low frequency, the trouble arising from imperfect balance is not lessened and may be increased.

It is the object of this invention to provide means whereby the foregoing difficulty incidental to the use of submarine cables designed for duplex working may be prevented.

This invention will be more clearly understood from the following description when read in connection with the attached drawing, of which Figure 1 shows one embodiment of the invention and Figure 2 shows a section of the tape of a recording instrument which makes clear the nature of the trouble which this invention is designed to prevent.

In Figure 1, 1 represents a submarine cable, one end of which is connected to the terminal 5 of the network A which has connected to its terminal 6 an artificial line 4 designed to simulate the electrical characteristics of the submarine cable and, therefore, to balance the said cable. Connected into the arms 2 and 3 of the said network are the condensers 15 and 16 respectively. A transmitting device 8, which may be of any well known type is connected to the junction 7 of the arms 2 and 3 to apply between the said junction point and ground impulses of the required polarity for transmission over the submarine cable. Bridged across the terminals 5 and 6 of the network A is a receiving circuit having a magnifier $M_1$, a relay $R_1$ and a recorder associated therewith. The magnifier $M_1$ may be a thermionic device such as the audion type of amplifier, or it may be a galvanometer type such as, for example, that disclosed in the patent to Dixon, No. 1,323,581, dated December 2, 1919. A condenser 9 and a resistance 10 are connected into the input circuit of the magnifier $M_1$ in order to change the time constant of the circuit and thereby substantially eliminate the effect of the unbalance that produces the so-called "roll," the manner of doing which will be more fully described hereafter. The output circuit of the magnifier is connected with the winding 12 of the relay $R_1$ in order to actuate the armature associated therewith, which reproduces in the recorder impulses in accordance with the line signals. It is to be understood that the scope of the invention is not limited to the use of a recorder therewith, since the recorder may be replaced by a section of cable, or any type of circuit into which it is desired to repeat the signals, without departing from the principle of the invention. The relay $R_1$ is of the well known type in which the armature is normally maintained in neutral position by means of the springs shown in the drawing, and is capable of movement in either direction from the said neutral position in accordance with the polarity of the impulses passing through the winding of the relay. Bridged across the conductors 13 which connect the relay to the recorder are the conductors 14 of a feed-back circuit. These conductors are connected with the network $N_1$, which in turn is connected with the winding 11 of the relay $R_1$. This circuit may be of the general type set forth in the patent to W. H. Martin, 1,347,049, dated July 20, 1920, or in the patent to Mathes, 1,295,553, dated February 25, 1919. Since the lowering of the time constant of the input branch of the receiving circuit tends to increase the effect known as "wandering zero," the use of a feed-back-circuit such as shown will tend to counteract this effect in a way that will later be made clear.

Figure 2 represents a section of tape showing the effect upon the zero line of the recorder of the receiving circuit at one terminal of the cable by the rapid transmission of a plurality of signals of the same polarity into the cable from the transmitting apparatus at the same end at which the said recorder is located. It will be noticed that the sections of the zero line designated $a$ and $b$ extend approximately parallel with the edge of the tape and at a uniform distance therefrom, whereas between points $c$ and $d$ the line deviates from its normal position, indicated by $f$. This variation of the zero line from its normal position resulted from depressing and holding down a key of the transmitting device 8 in a position to transmit a sustained dash signal.

In the operation of the arrangement shown in Figure 1, very low frequency components of the current transmitted from the transmitting device 8 may get into the receiving circuit bridged across the terminals 5 and 6 due to the imperfection of the balance of the terminal circuit for the particular frequencies. If no condenser such as 9 were present in the circuit, low frequency waves or impulses would pass through the magnifier $M_1$ into the relay $R_1$ and would reproduce in the recorder a displacement of the zero line such as is shown in Figure 2. It has been found, however, that by inserting a condenser 9 together with a resistance 10 in the input side of the magnifier $M_1$, the said condenser and resistance having such values that the time constant of the input circuit would be relatively low, the magnifier would not respond to frequencies as low as those represented by the "roll" in the duplex balance.

The relation between the values of the said condenser and resistance may be approximated from the equation $$\frac{1}{RC} = 2\pi nf$$

where R represents the resistance 10, C represents the capacity of condenser 9, $f$ represents the frequency of the "roll" which may be determined by careful observation in the course of operating the circuit, and $n$ represents the ratio between the lower limit of the band of signaling frequencies passed by the network and the frequency of the "roll." The value of this ratio is two or greater, and may be easily determined by trial.

The lowering of the time constant of the input branch of the receiving circuit tends to increase the trailing effect upon the signaling impulses received over the submarine cable which increases the difficulty in recording the received signals. This, however, is counteracted by using the feed-back circuit which may be connected with the relay in the manner shown in Figure 1, or in the manner shown in the patent to W. H. Martin or the patent to Mathes heretofore referred to. Thus the result of feeding back a certain amount of the low frequency component of the energy that passes through the relay $R_1$, at substantially the same rate at which the zero of the signals would normally tend to decline, is that the train of waves will maintain substantially its normal zero line. Thereby, the effect upon the received signals caused by lowering the time constant of the input branch of the receiving circuit is substantially neutralized.

Although this invention has been described in connection with a duplex signaling system, it is equally well adapted for use in connection with a simplex system in which signals are transmitted in only one direction at any time. Thus the arrangement shown in Figure 1 might be modified for simplex operation by omitting the ratio arms 2 and 3, and the artificial line 4, then grounding the point 6 of the receiving circuit, and inserting a switching device at point 5 of the submarine cable adapted to connect said cable either with the receiving circuit or with the transmitter 8. If the receiving circuit is connected with the cable for the reception of signals, the network comprising elements 9 and 10 will serve to suppress a low frequency disturbance, such as for example, that created by earth currents, in the same manner in which it suppressed disturbances in the duplex circuit.

It will be seen that this invention discloses means for preventing the undesired shifting of the zero line of the recording apparatus at a terminal of the cable when and as the result of earth currents or of the transmission of a plurality of signals of the same polarity in rapid succession from the transmitting apparatus at the same end of the same terminal of the said cable. Furthermore, the invention is not limited to an arrangement for lowering the time constant of the input circuit but covers such arrangement in combination with means for counteracting the effect that the lowering of the time constant of the input circuit may have upon signals received over the said cable by the receiving apparatus associated therewith.

Although this invention has been disclosed in a certain specific form, it is to be understood that it is not thus limited but is capable of embodiment in other and different forms within the scope of the appended claims.

What is claimed is:

1. In a signaling system adapted for the simultaneous transmission of signals in opposite directions, the combination with a cable, of an artificial line adapted to substantially balance the said cable, a bridge network connected with the said cable and artificial line, a transmitting circuit connected with the apex of the said bridge network, a receiving circuit comprising a condenser in series with a resistance bridged across the arms of the said network constituting a selective network for the suppression of all low frequency components, and a receiving device bridged across the said resistance and arranged to supply the low frequency component of the signaling currents desired to be received.

2. In a signaling system adapted for the simultaneous transmission of signals in opposite directions, the combination with a submarine cable connected with a duplex network and having an artificial line connected therewith of a transmitting circuit and a receiving circuit, the said receiving circuit comprising a condenser in series with a resistance bridged across the said duplex network and receiving apparatus bridged across the said resistance.

3. In a signaling system adapted for the simultaneous transmission of signals in opposite directions, the combination with a transmission line of an artificial line to balance the said transmission line, a bridged network comprising series capacity and resistance connected with both of said lines, transmitting means connected with the said network, a receiving circuit bridged across the resistance element of said network, the input branch of the said receiving circuit having a low time constant whereby the effect of low frequency waves impressed thereon may be prevented and a feed back circuit associated with said receiving circuit to reduce the wandering zero effect upon the recording apparatus.

4. In a signaling system, the combination with a transmission line of a receiving circuit having a branch connected with the said transmission line designed to suppress the low frequency components of all currents passing therethrough and receiving apparatus connected with said branch having a feed-back circuit designed to replace the suppressed low frequency component of the signaling impulses desired to be received.

5. In a submarine signaling system, a submarine cable, a receiving circuit comprising a condenser in series with a resistance connected between the terminal of the said cable and ground and constituting a selective network for the suppression of all low frequency components, and a receiving device bridged across the said resistance and arranged to supply the low frequency components of the signaling currents desired to be received.

6. In a submarine signaling system, a submarine cable, and a receiving circuit adapted to prevent low frequency disturbances from reaching a recording device, the said receiving circuit comprising a condenser in series with a resistance connected between the terminals of the cable and ground, and receiving apparatus bridged across the said resistance.

7. In a submarine signaling system, the combination with a submarine cable having means for impressing signaling currents upon one end thereof, of a receiving circuit connected between the other end of the submarine cable and ground, the connection including a condenser in series with a resistance the magnitudes of which are such as to constitute a selective network for the suppression of the low frequency components of all currents impressed upon the receiving circuit by the submarine cable, and a signal receiving device effectively bridged across the said resistance having means to restore to the signaling currents their low frequency components that were suppressed by the said selective network.

8. In a submarine signaling system, the combination with a submarine cable carrying signaling currents and also interfering currents, of a receiving circuit effectively connected therewith comprising a selective network made up of a condenser in series with a resistance adapted to suppress the low frequency components of all currents impressed thereon by the submarine cable, a receiving device having means to restore to the signaling currents the low frequency components suppressed by the said selective network, and a unilateral device effectively connecting the said receiving device across the resistance element of the selective network.

9. In a signaling system the combination with a transmission line of a receiving circuit having a branch connected with the said transmission line designed to suppress the low frequency components of all currents passing therethrough, a unilateral amplifying device connected with the said branch, and receiving apparatus connected with the output side of the unilateral device, the said receiving apparatus having means to replace the suppressed low frequency components of the signaling impulses desired to be received.

In testimony whereof we have signed our names to this specification this 16th day of April, 1920.

DANFORTH K. GANNETT.
MACLEAN KIRKWOOD.